Dec. 7, 1965  C. C. HILL  3,221,500

GAS TURBINE POWER PLANT

Original Filed June 26, 1959  2 Sheets-Sheet 1

INVENTOR.
CHARLES C. HILL
BY
Barnes, Kisselle, Raisch & Choate
ATTORNEYS

INVENTOR.
CHARLES C. HILL
BY
Barnes, Kisselle, Raisch & Choate
ATTORNEYS

3,221,500
GAS TURBINE POWER PLANT
Charles C. Hill, 1148 Vesper, Ann Arbor, Mich.
Original application June 26, 1959, Ser. No. 823,197, now Patent No. 3,118,278, dated Jan. 21, 1964. Divided and this application Mar. 22, 1963, Ser. No. 267,283
3 Claims. (Cl. 60—39.75)

This application is a division of my copending application Serial No. 823,197, filed June 26, 1959, now Patent No. 3,118,278, granted January 21, 1964, to which reference can be made for details of construction not shown or described in the present application.

This invention relates to gas turbine power plants.

It is an object of the invention to provide a gas turbine power plant which is light in weight, compact and efficient.

It is a further object of the invention to provide such a power plant which can be easily manufactured at relatively low cost as compared to the cost of prior gas turbine power plants.

It is a further object of the invention to provide such a gas turbine power plant having improved means for silencing the noise which is usually inherent in the operation of such power plants.

Figure 1:
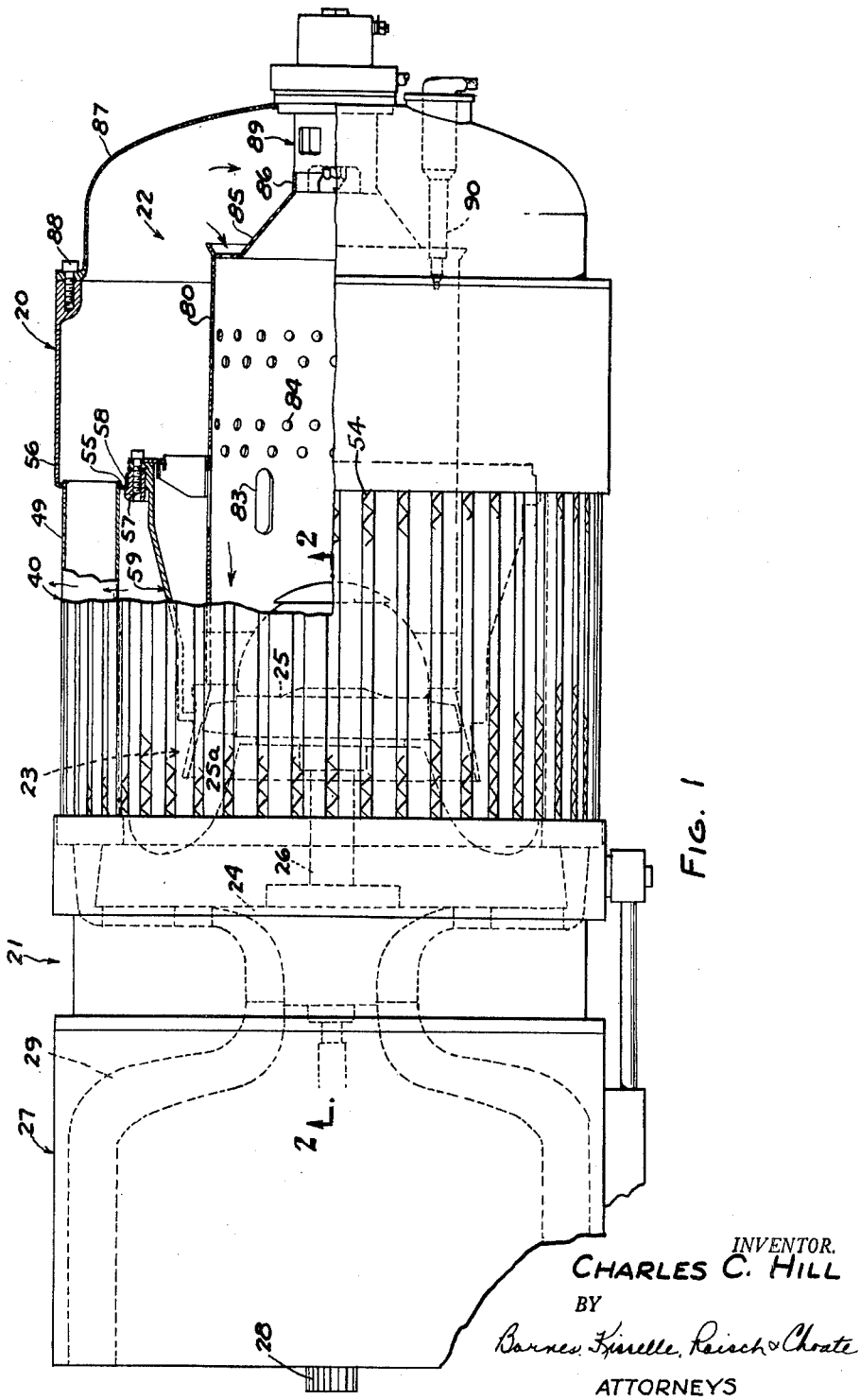
FIG. 1 is a fragmentary part sectional elevation of the gas turbine power plant made in accordance with the invention.

Referring to FIG. 1, power plant 20 embodying the invention comprises a compressor generally designated 21 which draws air from the atmosphere through an axial intake chamber 29 in housing 27. Air flows axially from compressor 21 through a heat exchanger 40 surrounding a turbine 23 to a burner 22 as more fully described below. The air is mixed with fuel in burner 22 and the gases of combustion pass from burner 22 to the turbine 23. The exhaust gases from turbine 23 pass radially outwardly through heat exchanger 40 and are exhausted to the atmosphere. Compressor impeller 24 and turbine rotor 25 are fixed on a shaft 26 which provides a drive to reduction gearing in housing 27 at one end of the power plant which, in turn, provides power to an output shaft 28.

Figure 2:
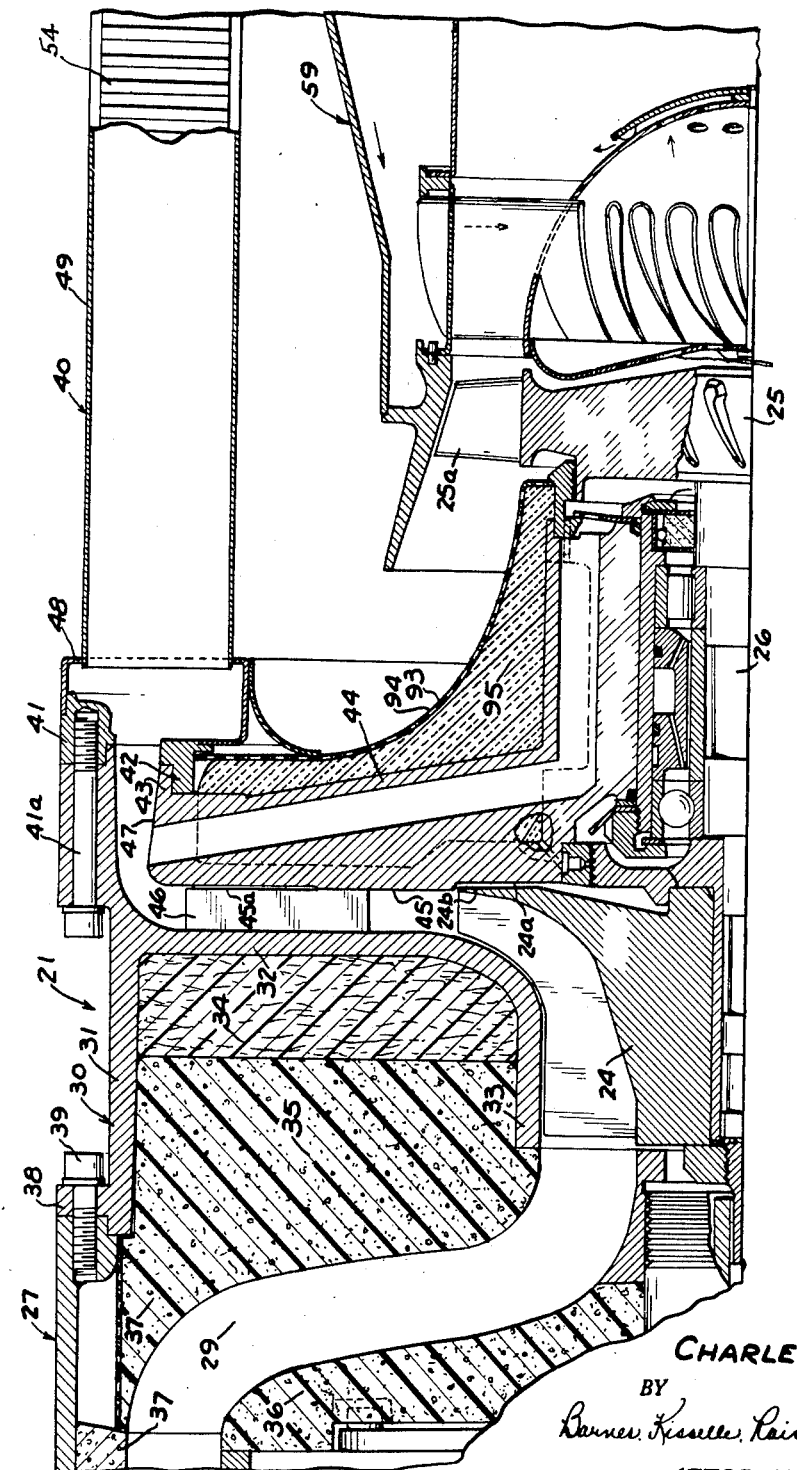
FIG. 2 is a fragmentary sectional view taken along the line 2—2 in FIG. 1.

Housing 27 is generally cylindrical. Compressor 21 includes a shroud 30 which is bolted to one end of the housing 27. As shown in FIG. 2, shroud 30 includes an outer cylindrical web 31, a radial web 32 extending inwardly from intermediate the edges of cylindrical web 30 and an inner cylindrical web 33 extending axially from the inner end of the radial web 32. In this manner, shroud 30 provides an annular space which faces the annular chamber 29. This annular space is filled with sound absorbing material. As shown in FIG. 2, the material 34 nearest the web 32 is preferably of such a type as to withstand high temperatures, such as glass fibers, while the material 35 adjacent the annulus 29 is of the high sound absorbing type such as foamed plastic, preferably of the polyurethane ester type. Foamed plastic material is also provided around the inner and outer sides of the annular chamber 29 as at 36, 37 to absorb and dissipate the noise. The exposed surfaces of the materials 35, 36, 37 are shaped to form an annular passageway to the impeller 24 of the compressor. A flange 38 on one end of the cylindrical web 31 abuts the edge of the housing 27 and bolts 39 are threaded into the housing 27 to hold the compressor shroud 30 in position on the housing 27.

The use of a foamed plastic to form the sides of the annular chamber 29 permits the sides of the chambers to be readily formed to the desired configuration. Foamed plastic materials such as polyurethane esters are resistant to erosion and deformation due to movement of the air at high speeds through channel 29 in addition to being effective in absorbing sound caused either by movement of the air through the channel 29 or sound caused from the turbine proper.

The foamed plastic is light in weight and withstands deterioration when exposed to oil or water. In addition, it is low in cost and may be foamed in place so that no fastenings are required. The elimination of the fastenings not only reduces the cost but, in addition, results in a greater safety because there is no danger of the fastenings becoming loose and passing into the impeller 24. Elimination of fastenings also reduces the cost of assembly.

Heat exchanger assembly 40 is mounted on the other end of the cylindrical web 31 of shroud 30 and includes a ring 41. Bolts 41a extend axially through a flange on web 31 and are threaded into ring 41. Ring 41 is connected to a pilot flange 42 by a toroidal manifold 48. Flange 42 engages with a flange 43 on a bearing housing 44 and holds the bearing housing 44 in concentric relation to the compressor shroud 30. As further shown in FIG. 2, bearing housing 44 includes a surface 45 which extends radially in spaced parallel relationship to the adjacent surface of the radial web 32 of the compressor shroud 30. In addition, integral curved diffuser vanes 46 extend from radial web 32 axially into contact with the adjacent surface 45 of bearing housing 44. In practice, a slight clearance 45a on the order of 0.004 inch is provided on the surface 45 of bearing housing 44 to insure contact of the radially innermost portion of vanes 46 with surface 45 when bolts 41a are tightened. This insures a rigid mounting of housing 44 on compressor shroud 21. These diffuser vanes serve to decrease the velocity and increase the pressure of the air leaving the impeller 24. The outer peripheral surface 47 of the bearing housing 44 is spaced from the radially inner surface of the web 31 to provide an axial diffusing passageway which communicates with the space between the surface 45 and the web 32 and further decreases the velocity of the air.

Hollow toroidal manifold 48 is mounted on the ring 41 and welded or brazed thereto to provide a manifold into which the air is directed from the axial passageway between web 31 and peripheral surface 47. This passage is unobstructed by bolts or other fastening devices. A plurality of tubes 49 are mounted at one end of manifold 48 with the interior of the tubes communicating with the manifold. As shown in FIG. 2, the tubes 49 are arranged circumferentially around manifold 48 and extend axially thereof. The cross section of each tube preferably comprises generally radially inwardly extending sides 50, 51 and opposed circumferentially extending ends 52, 53. Sides of adjacent tubes 49 are parallel. Corrugated strips 54 are provided between the tubes. Each strip 54 is corrugated in a radial direction (FIGS. 1 and 2). The exhaust gases from the burner 22 pass between the tubes 49 through the strips 54 and thereby transfer heat to the air passing through the tubes 49.

As shown in FIG. 2, bearing housing 44 supports a baffle 93 which directs the exhaust gases from turbine rotor 25 to the area adjacent tubes 49. Baffle 93 is provided with perforations 94 and sound absorbing and heat insulating material 95 such as refractory fibers is positioned behind baffle 93.

The compressor impeller 24, turbine rotor 25 and the shaft 26 are rotatably mounted in the bearing housing 44.

As shown in FIG. 1, the ends of the tubes 49 opposite manifold 48 extend through a radial end wall 55 of a cylindrical shell 56 and passes the air through tubes 49 into the cylindrical shell 56. A ring 57 is fastened to a flange 58 around the inner periphery of wall 55 and a turbine shroud assembly 59 is mounted on the ring 57 by bolts 60.

Referring to FIGS. 1 and 2, a generally cylindrical flame tube 80 is provided in the power plant. Flame tube 80 is formed with a plurality of openings 83, 84 which permit air from the compressor to pass from the shell 56 radially inwardly into the tube. A generally frusto-conical member 85 telescopes into the outer end of tube 80 and centers the outer end of tube 80. Member 85 is formed at its outer end with an axial opening 86. The outer end of shell 56 is closed by a dished and flanged head 87 which is fixed to the end of shell 56 by bolts 88. Dished head 87 supports a fuel nozzle assembly 89 and an igniter 90. Fuel nozzle assembly 89 extends into the open outer end of member 85 and provides a rotating spray of fuel to the interior of the flame tube 80, as presently described.

In operation, air is drawn by the compressor impeller 24 from the exterior through annular chamber 29 in housing 27 and is compressed and directed radially outwardly between surface 45 of bearing housing 44 and the adjacent surface of web 32 (FIG. 2). The velocity of the air is partially converted to pressure by diffuser vanes 46. The air then passes through the axial passageway between the end of bearing housing 44 and the web 31 where it is further diffused and flows to the manifold 48 through the tubes 49 to the shell 56 (FIG. 1). The air then flows radially inwardly. The major portion of the air passes through the openings 84 in burner tube 80 and is mixed with the fuel emanating from the nozzle and the mixture is burned. Another portion of the air passes through openings 83 to cool or quench the combustion gases to the desired operating temperature.

The gases of combustion in flame tube 80 are directed by the stator vanes against the blades on the turbine rotor 25 and then are exhausted axially. Baffle 93 redirects the exhaust gases approximately 180° into the area between the shroud 59 and the tubes 49 and the exhaust gases then pass radially between the tubes 49 into contact with the corrugated strips 54 so that some of the heat of the exhaust gases is transferred to the air passing through the tubes 49.

By providing insulating material 34, 35 and 36 adjacent the inlet of the compressor and insulating material 95 adjacent the outlet of the turbine substantial reduction in noise is achieved providing for a more quiet operation of the gas turbine power plant.

I claim:
1. The combination comprising
   a compressor having an axial inlet and a generally radial outlet,
   said compressor having a shroud adjacent said axial inlet and said radial outlet,
   a body of heat insulating material within said shroud adjacent said radial outlet,
   a first body of sound absorbing material on said shroud in juxtaposed relation to said first mentioned body,
   a second body of sound absorbing material spaced from the exterior surface of said first body of said sound absorbing material,
   the adjacent surfaces of said bodies of sound absorbing material being so shaped to define an annular chamber having a first axial portion, a second radial portion and a third axial portion extending to the axial inlet of the compressor.
2. The combination set forth in claim 1 wherein said sound absorbing material comprises polyurethane foam.
3. The combination set forth in claim 1 wherein said heat insulating material comprises glass fibers.

References Cited by the Examiner
UNITED STATES PATENTS

| | | | |
|---|---|---|---|
| 869,868 | 10/1907 | Spencer | 230—117 |
| 2,267,275 | 12/1941 | Gevrnz | 230—232 |
| 2,553,867 | 5/1951 | Parducci | 60—39.36 |
| 2,587,057 | 2/1952 | McVeigh | 60—39.36 |
| 2,835,107 | 5/1958 | Ward | 60—35.6 |
| 2,925,714 | 2/1960 | Cook | 60—39.51 |
| 3,000,464 | 9/1961 | Watters | 181—33 |
| 3,118,278 | 1/1964 | Hill | 60—39.36 |

SAMUEL LEVINE, *Primary Examiner.*